United States Patent [19]
Smolka

[11] 3,919,644
[45] Nov. 11, 1975

[54] AUTOMATIC ANTENNA COUPLER UTILIZING SYSTEM FOR MEASURING THE REAL PART OF THE COMPLEX IMPEDANCE OR ADMITTANCE PRESENTED BY AN ANTENNA OR OTHER NETWORK

[75] Inventor: Carl M. Smolka, Wayne, N.Y.

[73] Assignee: General Dynamics Corporation, St. Louis, Mo.

[22] Filed: Feb. 18, 1972

[21] Appl. No.: 229,215

Related U.S. Application Data
[63] Continuation of Ser. No. 7,619, Feb. 2, 1970, abandoned.

[52] U.S. Cl. .............................. 325/174; 333/17
[51] Int. Cl.² ........................................ H04B 1/04
[58] Field of Search .................. 325/171–179; 333/17

[56] References Cited
UNITED STATES PATENTS
3,281,721   10/1966   Clark .............................. 325/174
3,496,493   2/1970   Nielsen ........................... 325/174

*Primary Examiner*—Albert J. Mayer
*Attorney, Agent, or Firm*—Martin Lukacher

[57] ABSTRACT

An automatic antenna coupler is described which includes a matching network having adjustable reactive elements. Control for these elements is provided by a system for detecting the real part of the complex impedance presented by the antenna or matching network. A logic and control system for adjusting the reactive elements is operated in accordance with the real part detector output so as to provide the desired impedance match.

12 Claims, 7 Drawing Figures

INVENTOR.
CARL M. SMOLKA

AUTOMATIC ANTENNA COUPLER UTILIZING SYSTEM FOR MEASURING THE REAL PART OF THE COMPLEX IMPEDANCE OR ADMITTANCE PRESENTED BY AN ANTENNA OR OTHER NETWORK

This application is a continuation of Ser. No. 07,619, filed 2/2/70, now abandoned.

The present invention relates to automatic-control systems and particularly to systems for measuring the real part of complex loads which is adapted to automatically control matching networks for matching the output of a signal providing device to the load.

The invention is especially suitable for use in automatic control circuits for antenna couplers and is adapted to provide an improved automatic antenna coupler. Feature of the invention are also applicable to systems for measuring and displaying or otherwise indicating the impedance or admittance presented by complex electrical networks.

Although matching networks containing inductive and capacitive elements can theoretically be designed to match a transmitter output to an antenna so as to provide a tolerable VSWR level at the transmitter output, the problem remains to automatically control the values of the network elements so that they may be rapidly tuned to provide the proper match. The problem is complicated because the tuning functions of the variable elements are not independent. Thus, it has not been feasible to control the elements of a matching network in accordance with a readily available function of the transmitter output signals. Impedance and phase sensors have generally been used to control variable matching networks. The output signals from these sensors are not orthogonal. Considerable interaction results as the variable elements are adjusted in accordance with the phase and impedance sensor outputs. The adjustments are therefore iterative and the network must hunt as it strives to attain a match. Also, the adjustments called for by the phase and impedance sensor outputs may tend to tune the network in the direction opposite from that which is needed for the desired match. Complicated logic systems have therefore been used to sense overtuning or other runaway conditions so as to control automatic couplers.

It is an object of this invention to provide an improved control system for matching networks.

It is a further object of the invention to provide an improved automatic antenna coupler.

It is another object of the invention to provide an improved system for measuring the parameters of complex impedances and admittances presented by a load or other network.

It is still another object of the invention to provide an improved control system for impedance matching networks such as antenna coupler networks which provide for rapid tuning to a matching condition.

It is still further object of the present invention to provide an improved automatic tuning system, suitable for use in an automatic antenna coupler, wherein tuning is accomplished directly to proper values for matching a source to a load without the need for interative tuning processes or hunting due to interdependency of the tuning elements of the matching network.

Briefly described, the invention provides a system for detecting the real part of a complex impedance or admittance and further provides an automatic antenna coupler utilizing such a detector for controlling a matching network which matches a transmitter or other source of signals to the load, such as an antenna.

The real part detector is responsive to voltages which represent the current to and the voltage across the load or at the input to the matching network. The detector has two channels. In one of these channels, a phase detector which is responsive to the current and voltage components of the signal from the source, provides an output which is proportional to the component of the current which is in-phase with the voltage. This phase detector may, for example, be a balanced mixer. In the other channel, there is provided a circuit which produces a voltage corresponding to the voltage component of the signal going to the source. This circuit may be an amplitude detector. The ratio of the outputs in each channel is taken as by deriving the difference between voltages corresponding to the logarithms of each of these channel outputs. When the voltage representing the current is in the numerator of the ratio, the output represents the real part of the complex admittance. When the voltage representing the current is in the denominator, the output corresponds to the real of the complex impedance. In order to obtain an error signal indicating the deviation of this real part detector output from a desired value, a comparator may be provided such that the output is compared with a reference level representing the desired real part of the admittance or impedance. In an auomatic antenna coupler, the error signal may be used to control an adjustable reactive element of the matching network. In a preferrred form of the invention, the adjustable reactive elements are first controlled by the output which represents the real part of the impedance and then by the output which represents the real part of the admittance. Thus, the reactive elements are directly turned to the requisite values for the match, since the desired pure real component is rendered directly when (and only when) the real part of the impedance and the real part of the admittance are reciprocals.

The invention itself, both as to its organization and method of operation, as well as additional objects and advantages thereof will become more readily apparent from a reading of the following description in connection with the accompanying drawings in which.

Figure 1:
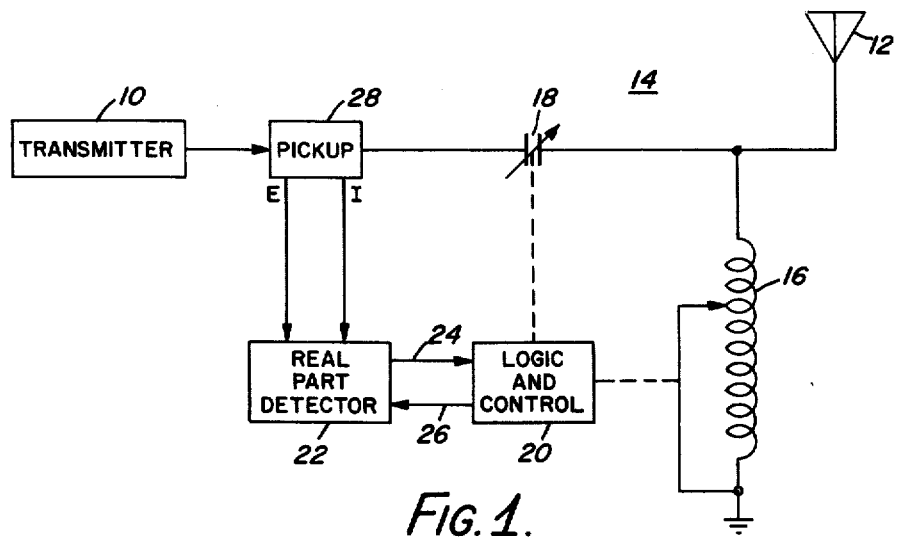
FIG. 1 is a diagram, partially in block and partially in schematic form, showing an automatic antenna coupler in accordance with the invention.

Referring more particularly to FIG. 1, a transmitter 10 or other source of radio frequency energy, say in the HF band, provides signals which are to be transmitted by way of an antenna 12. The antenna 12 is a load which presents a complex impedance, and of course, a complex admittance to the output of the transmitter. In order to provide maximum power transfer from the transmitter output to the antenna and prevent damage to the transmitter output stanges due to reflections and other overvoltage conditions which might be caused by a mis-match, the transmitter output impedance, referred to herein as $Z_0$ should be matched to the antenna impedance $Z_L$. This involves a conversion or translation of the complex antenna impedance to $Z_0$. In other words, the real part and the imaginary part of the complex impedance must be translated so as to present only a real part equal to $Z_0$ at the transmitter output frequency. To this end, a matching network 14 is provided. This network is depicted for purposes of illustration as an "L" network, including a shunt inductor 16 and a series capacitor 18. Both of these reactive elements 16 and 18 are adjustable. They, for example, may have mechanical means, such as motor driven sliders in the case of the inductor 16, or movable plates in the case of the capacitor 18. Alternatively, the adjustment may be provided by solid state or relay switching which selectively connects larger or smaller increments of capacitance or inductance into the series and shunt arm of the network 14.

The adjustment is provided by a logic and control system 20, which may include servo motors or relay for operating the adjustment mechanism of the inductor 16 and the capacitor 18, such that the adjustment may be performed independently. In other words, the inductor 16 may be adjusted separately from the adjustment of the capacitor 18. The logic and control system may be designed in accordance with conventional servo and control system techniques. For example, it may be an error signal responsive servo system which is controllable, either on an analog or digital basis.

The error signals for controlling the logic and control circuits 20 are provided by a real part detector 22. The output of this detector on a line 24 is a measure of the real part of the impedance or admittance measured at the input of the matching network 14. A return line 26 from the logic and control circuits 20 to the real part detector 22 is operative to indicate when adjustment of the inductor 16 has been completed so as to bring the real part of the complex impedance measured at the input of the matching network to a value which is equal to $Z_0$. Thus, when a condition of real part match is obtained, the output on line 26 conditions the real part detector to detect the real part of the admittance, rather than the real part of the impedance. A logic and control circuit 20 then operates the capacitor 18 adjustment exclusively and permits the adjustment theretofore made of the inductor 16 to remain in its set condition. Adjustment of the capacitor continues until the real part of the admittance is equal to $Y_0$ which is the value of conductance which is reciprocal with the value of resistance which corresponds to $Z_0$. Inasmuch as the real part of admittance and the real part of impedance are reciprocals only when the imaginary part of the complex load impedance is reduced to zero, the adjustment of the capacitor 18 effectively removes the imaginary part of the impedance remaining after the adjustment of the inductor 16. It will therefore be observed that the same circuitry which is provided for control of impedance, when conditioned to control admittance, is operative to tune the matching network to the desired matched condition.

The real part detector operates upon the voltage and current components of the signal applied at the input of the matching network in the system shown in FIG. 1. To this end, a pickup 28 is connected in the transmission line between the transmitter and the matching network input and provides voltages to the real part detector which are proportional to the current and voltage components of the signals on the line.

Figure 3:
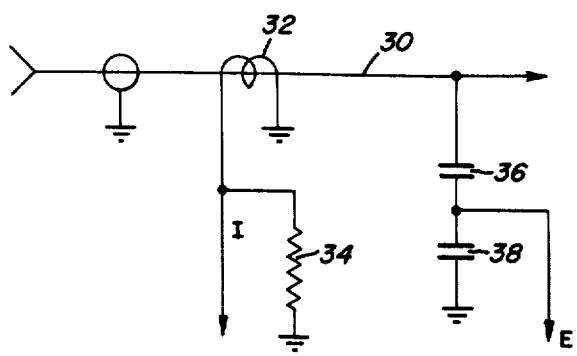
FIG. 3 is a schematic diagram of the circuitry which derives the current and voltage component of the signal which are to be provided to the real part detector in the antenna coupler shown in FIGS. 1 and 2.

The pickup 28 is shown in greater detail in FIG. 3. The line from the transmitter 10 to the matching network may be a coaxial cable. An inductive pickup 32 around the central conductor of the line 30 senses the current component. A voltage proportional to this current component is developed across the resistor 34 and is applied to the real part detector 22. The inductive coupling may be provided, for example, by means of a toroidal core of magnetic, say ferrite, material which is disposed around the central conductor of the cable 30. The coil on the toroidal core provides the current component. The voltage component may be obtained by means of a capacitive divider, including two capacitors 36 and 38.

Figure 2:
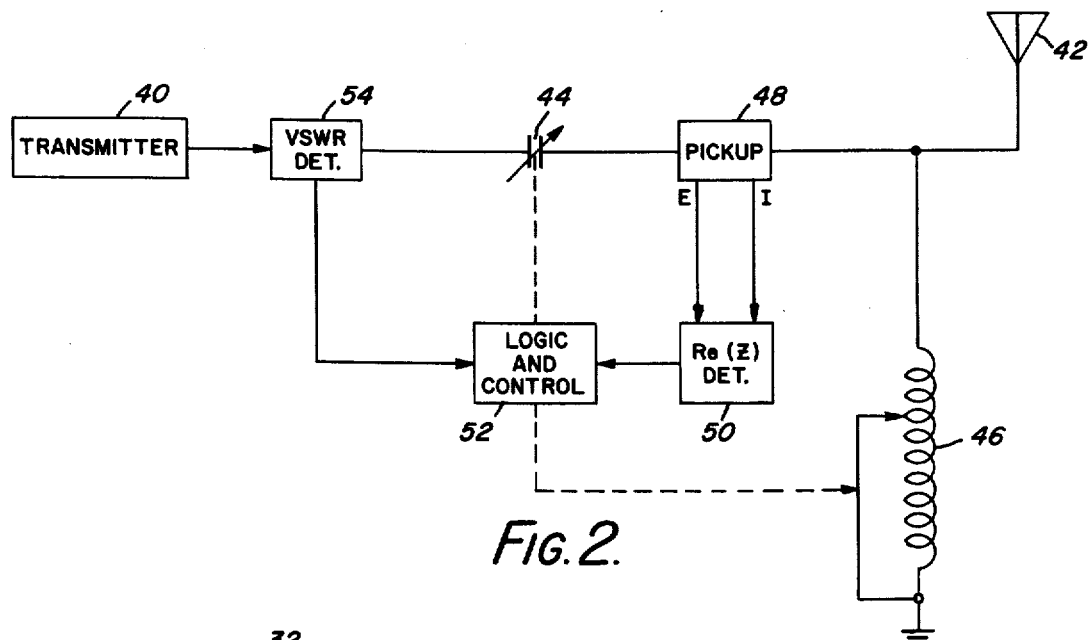
FIG. 2 is a diagram similar to FIG. 1 showing an automatic antenna coupler in accordance with another embodiment of the invention.

The invention may also be embodied in an automatic antenna coupler, as illustrated in FIG. 2. A transmitter 40 provides the source of radio frequency signals which are to be transmitted by way of antenna 42. A matching network, including a capacitor 44 of the variable type and a variable inductor 46 are connected between the transmitter 40 and the antenna 42. The inductor 46 is in shunt with the antenna, while the capacitor 44 is in series. A pickup 48, similar to the pickup 28, is disposed effectively at the output of the matching network (i.e. between the network and the antenna 42). The current and voltage components of the signals which are supplied to the antenna are applied to a real detector 50. This real part detector 50 is similar to the detector 22, except that it is conditioned only to detect the real part of the impedance presented at the output of the matching network. The output signal from the real part detector controls a logic and control circuit 52 which had independent means for adjusting the shunt conductor 46 and the series capacitor 44. Another input to the logic and control circuits 52 is provided by a VSWR detector 54 which is connected at the output of the transmitter 40 and detects the voltage standing wave ratio at the transmitter output. Such detectors may comprise bi-directional couplers and associated circuitry for obtaining the ratio of the forward to the reflected voltage obtained at the output of the couplers. Reference may be had to the text "Antennas and Transmission Lines" by John A. Kuecken, published by the Howard W. Sams & Company, Inc., Indianapolis, Indiana (see especially page 154). Other VSWR detectors of the types which are commercially available may be used.

In operation, the real part detector 50 is first utilized by the logic and control circuits 52 to adjust the variable inductor 46. The inductor 46 is adjusted so that the load impedance as measured at the output terminal of the matching network is equal to the transmitter output impedance $Z_0$ so far as the real part of low impedance is concerned.

After the shunt inductor 46 is adjusted, the capacitor 44 is adjusted in response to the output from the VSWR detector 54 so as to reduce the VSWR to a tolerable level. This capacitor adjustment effectively removes the residual imaginary part of the impedance as presented at the input of the matching network.

The logic and control circuits 20 and 52 may also contain relay switches for short circuiting VSWR detector 54 and the pickup 48, in the case of the logic and control circuit 52 and the pickup 28 in the case of the logic and control circuit 20 after the matching network is tuned. It is desirable also to provide tuning at low power and after tuning is accomplished to control the transmitter to provide high power output.

Figure 4:
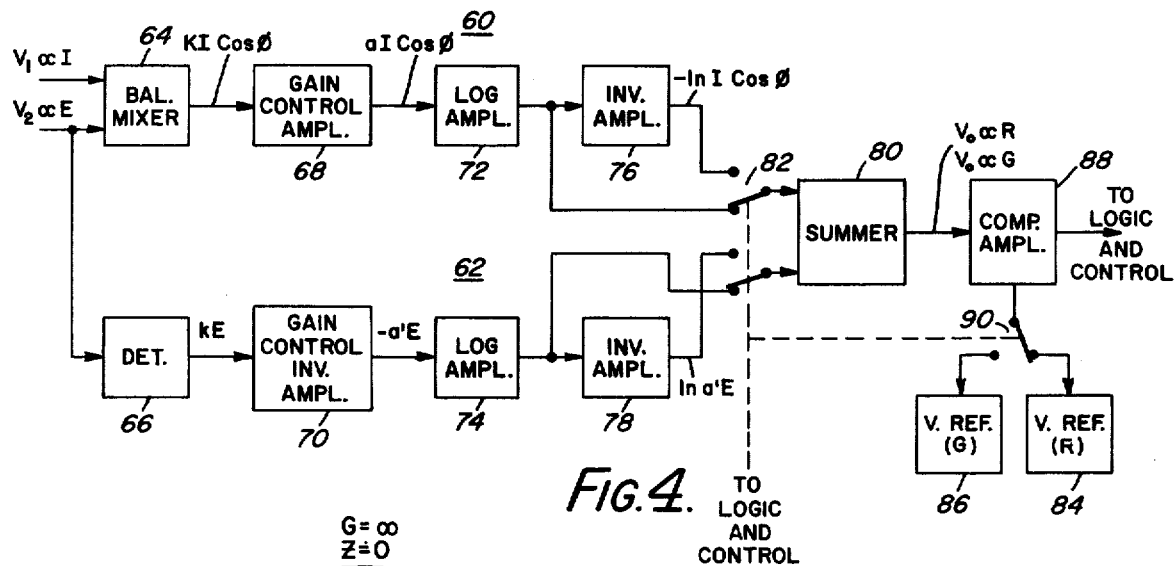
FIG. 4 is a block diagram of the real part detector which is shown in FIG. 1.

Referring to FIG. 4, the real part detector 22 is shown in greater detail. A voltage $V_1$ which is proportional to the current I and a voltage $V_2$ which is proportional to the voltage E as derived from the pickup are applied to the real part detector.

Figure 6:
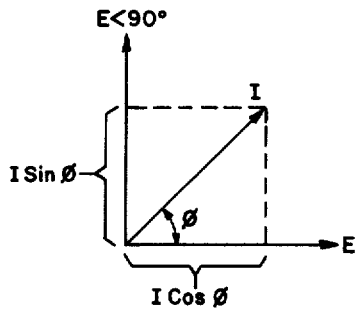
FIG. 6 is a vector diagram which also illustrates the mode of operation of the real part detector, as shown in FIG. 4, as well as a real part detector which is shown in FIG. 7.

The real part detector has two channels 60 and 62. The channel 60 will be referred to as the current channel, while the channel 62 will be referred to as the voltage channel. Channel 60 includes a balanced mixer 64 to which the voltages $V_1$ and $V_2$ are applied. A gain control amplifier may be connected at the input of the balanced mixer which handles $V_2$ for the purpose of adjusting the amplitude of the voltage $V_1$ and $V_2$ so that they are approximately equal to each other. The balanced mixer itself may be a phase detector circuit which provides a direct current output corresponding to the phase difference between the signals applied thereto. The circuit sold by Hewlett-Packard of Palo Alto, California, their part No. 10514-A is suitable for use as a balanced mixer. The output of the balanced mixer is therefore proportional to the component of the current I which is in phase with the voltage. In other words, the balanced mixer takes the dot product of the voltages applied thereto. Since one voltage is proportional to the current, the dot product is proportional to cosine $\phi$ where $\phi$ is the phase angle between the current and the voltage (see FIG. 6). The coefficient of cosine $\phi$ is, of course, the current I and, as shown in FIG. 6, the output of the balanced mixer is a direct current voltage equal to $KI \cos \theta$.

In the voltage channel 62, $V_2$ is applied to an amplitude detector which may be a half or full wave rectifier, the output of which is low pass filtered to produce a direct current voltage which varies in accordance with the peak-to-peak amplitude of the voltage $V_2$. Accordingly, the output of the detector 66 is equal to $KE$, where $K$ represents the attenuation presented by the detector.

Gain control amplifier 68 and an inverting gain control amplifier 70 are respectively connected at the output of the balanced mixer 64 and the detector 66. These amplifiers 68 and 70 enable the calibration of the real part detector, as will be explained hereinafter. The output of the amplifier 68 after gain control may be represented as $aI \cos \theta$, where $a$ represents the gain control coefficient. The output of the gain control inverting amplifier 70 may similarly be represented as $-a'E$, where $a'$ is the gain control coefficient.

In order to obtain an output representing the real part of the impedance represented by the input signal to the detector or the real part of the admittance represented by these signals, the ratio of the outputs from the gain control amplifiers is derived. In other words, the ratio of the in phase component of the current as provided by current channel 60 with respect to the voltage (viz. the current and voltage are in phase) is equal to the conductance of the complex admittance represented by the input signals to the real part detector. Similarly, the ratio of the voltage as provided by the channel 62 to the proportional to the in phase component of the current provided by the channel 60 is proportional to the resistance which is the real part of the impedance represented by the real part detector input signals.

These ratios are obtained by means of logarithmic amplifiers 72 and 74 which are connected at the output of the gain control amplifiers 68 and 70 respectively. Inverting amplifiers 76 and 78 are also connected to the output of the logarithmic amplifiers 72 and 74 respectively. A summing circuit 80 which may be a resistive adding network connected to the input of an operational amplifier may be alternatively connected directly to the logarithmic amplifier outputs or to the inverting amplifier 76 and 78 outputs. A single pole, double throw switch 82 which may be provided by a set of relay contacts provides these alternative connections. In the event the connections are made directly to the logarithmic amplifier outputs, as shown in FIG. 4, the summer output is proportional to the real part of the impedance (viz. the resistance), since the logarithmic amplifiers 72 and 74 provide an additional inversion. Thus, the difference between the log of the voltage and in phase current components is derived at the output of the summer ($V_0 = \ln a'E - \ln I \cos \theta$). When the inverting amplifiers 76 and 78 are connected to the summer 80, the output $V_0$ is therefore directly proportional to the conductance G.

In order to provide an output signal from the real part detector which is a measure of the deviation of the real part of the impedance or admittance from their desired value, reference voltage sources 84 and 86 are provided which may be connected alternatively to a comparator amplifier 88 via a switch 90. The switch 90 may be controlled by the same relay as the switch 82. The comparator amplifier may be an analog device, in which case the output thereof is error voltage which is proportional to the deviation in magnitude and polarity or sense of the real part of the impedance or admittance from its desired value. If the comparator amplifier is a digital type, it will provide an output representing, say a logical "O", in the event that there is a difference in magnitude of $V_0$ and the reference voltages provided by these sources 84 or 86, depending upon which one is used.

The switches 82 and 90 may be controlled by the logic and control circuit 20 when the real part detector is used in the circuit shown in FIG. 1. In the event that the real part detector is to be adapted to measure only the real part of impedance, such as is the case for the real part detector 50 used in FIG. 2, the switches 82 and 90 and the inverting amplifiers 76 and 78 and the reference source 86 are not required. Then the comparator 88 provides merely an output which represents the deviation of the real part of the impedance from its desired value, as represented by the reference voltage produced by the source 84.

In order to calibrate the real part detector, it is necessary merely to provide a known impedance and to adjust the gain control amplifiers 68 and 70 to provide the desired output which can then be taken to be equal to the value of resistance which is used to calibrate the detector. A number of differently valued resistors may be used to provide a calibration curve of output voltage $V_o$ with respect to resistance.

Figure 7:
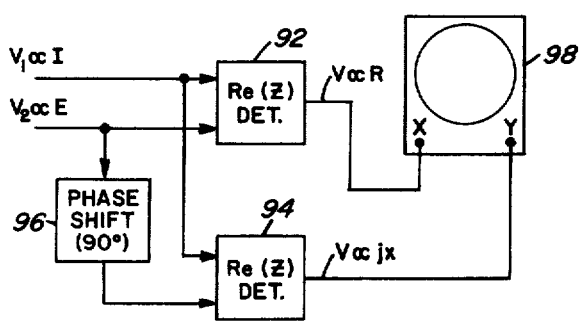
FIG. 7 is a block diagram of an impedance measuring system which provides a display of impedance and which utilizes real part detectors of the type shown in FIG. 4.

As shown in FIG. 6, by utilizing the component of the voltage which is shifted in phase by 90° as an input to the real part detector, an output from the detector is obtained which is a function of the imaginary part of the complex impedance represented by the input signal. As shown in FIG. 7, a real part of impedance detector 92 may be used, together with an identical real part of impedance detector 94. The voltage $V_2$ which is proportional to the voltage component of the signal, is first shifted in phase 90° by means of a phase shifter 96 and applied to the voltage input terminal of the real part detector 94. The output of the real part detector 92 will therefore be proportional to resistance, while the output of the real detector 94 is proportional to the reactive component (viz. jX). A vectorial display of impedance which will illustrate the variations of impedance in real time may be obtained by an oscilloscope 98 to which the outputs of the real part detectors 92 and 94 are applied. The output proportional to resistance may be applied to the X-axis and cause a deflection in the horizontal direction, while the output proportional to the imaginary part of the impedance is applied to the Y-axis, so as to obtain a scan of the beam in the vertical direction. By utilizing a cathode ray tube with persistence, a plot of the impedance sector can be obtained on the screen of the oscilloscope 98. Of course, recording oscillographs and other types of oscilloscopes may be used to provide a direct measurement of impedance. Admittance may be measured by using the inverse ratio of the logarithmic amplifier outputs as was explained in connection with FIG. 4.

Figure 5:
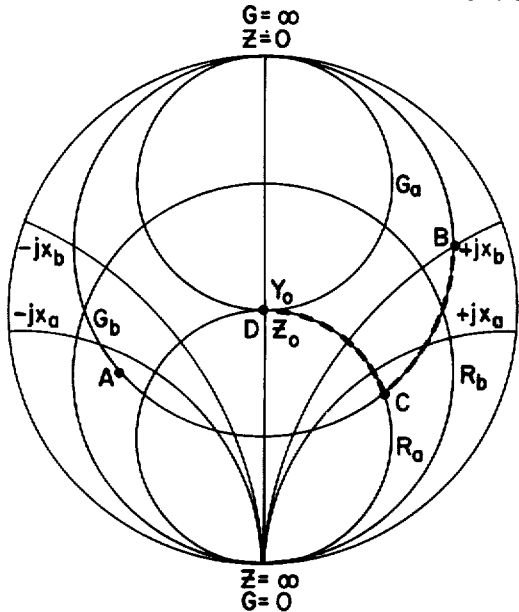
FIG. 5 is a Smith chart which illustrates the operation of the automatic antenna coupler shown in FIG. 1 in directly tuning the matching network to a desired match.

The operation of the system to tune the matching network 14 is further illustrated in FIG. 5, which shows a simplified Smith chart of the impedance and admittance presented at the input terminal of the matching network 14. As was explained above, the logic and control circuit operates the real part detector so that the switches 82 and 90 are initially in the position as shown in FIG. 4. For example, if the load impedance is initially at point A, the shunt inductor 16 is initially at its maximum susceptance value and the series capacitor 14 initially short circuited, the effective impedance measured at the input to the matching network is shifted from point A to point B. The inductor 16 is then varied until the real part of the impedance is altered so that it reaches a resistance value $R_a$ equal to $Z_0$ (shown at point C). The imaginary part of this impedance still exists. When a $Z_0$ condition is sensed, the logic and control circuits operate the switches 82 and 90 so that the real part detector is conditioned to measure the conductance which is the real part of the admittance Y and the capacitor 18 is tuned until the real part of the admittance is equal to $Y_0$. Since $Y_0$ and $Z_0$ are reciprocal, the imaginary part of the complex impedance left at the end of the shunt inductor tuning cycle (viz. the imaginary part of the impedance at point C on the Smith chart) is automatically removed when the capacitor is tuned so that the system is tuned when the capacitor 19 is adjusted to make the input impedance appear at point D on the chart. The VSWR detector 54 shown in FIG. 2 operates in a similar manner to remove the residual imaginary part of the complex impedance. It will be observed therefore, that antenna tuning is not an iterative process, but the tuning elements are tuned independently; the inductor handling the real part of the impedance and the capacitor the residual imaginary part. Thus, tuning may be accomplished rapidly and by logic and control systems which is of a relatively simple design.

From the foregoing description it will be apparent that there has been provided in improved automatic antenna coupler. Features of the system, specifically the real part detector; are adaptable generally to impedance measurement devices and may provide substantial improvements in automatic impedance measurement over conventional bridge type impedance measurement devices. Variations and modifications of the herein described system and antenna couplers within the scope of the invention may suggest themselves to those skilled in the art. Accordingly, the foregoing description should be taken merely as illustrative and not in any limiting sense.

What is claimed is:

1. A system for transforming the complex load which has electrical impedance and admittance characteristics presented by an electronic signal untilization device which receives signals, which system comprises:
   an adjustable reactive element connected to said electronic signal utilization device and forming part of said load;
   detection means response to the signals applied to said device for providing an error signal having a magnitude corresponding to the magnitude of the real part of one of said admittance and impedance of said load; and
   means responsive to said error signal for adjusting said element until said error signal reaches a predetermined magnitude.

2. The invention as set forth in claim 1 wherein said system further comprises another adjustable reactive element, said elements being respectively connected in series and in shunt with said device and forming parts of said load, means included in said detection means for alternatively providing said error signal with magnitudes corresponding to the real part of the impedance and the real part of the admittance presented by said load, and means included in said error signal responsive means for independently adjusting said elements, one in response to said impedance real part corresponding error signal magnitude until the magnitude of said impedance real part error signal is of a predetermined magnitude and the other in response to said admittance real part corresponding error signal magnitude until the magnitude of said last named error signal is of a predetermined magnitude.

3. The invention as set forth in claim 2 wherein said device is an antenna and said reactive elements are an inductor connected in shunt and a capacitor in series with said antenna.

4. The invention as set forth in claim 1 including a second adjustable reactive elememt, said first mentioned element being connected in series with said device and said second element in shunt with said device, means responsive to signals reflected from said device for providing a second error signal having a magnitude corresponding to the other of said admittance and impedance of said load, and means included in said error signal responsive means for adjusting one of said first and second elements in response to one of said first and second error signal magnitudes and the other of said first and second elements in response to the other of said first named and second error signal mangitudes.

5. The invention as set forth in claim 4 wherein said reflected signal responsive means is a VSWR detector.

6. The invention as set forth in claim 1 wherein said detection means includes first and second channels, said first channel including means responsive to the voltage and current of said signals for providing a third output proportional to the amplitude of the component of said current which is in phase with said voltage, said second channel including means for providing a fourth output proportional to the amplitude of said voltage, means output responsive to said third and fourth outputs for providing a fifth output proportional to the ratio thereof.

7. The invention as set forth in claim 6 including means for comparing said fifth outout with a reference signal to provide the difference therebetween as said error signal.

8. The invention as set forth in claim 6 wherein said means included in said first channel is a balanced mixer circuit.

9. The invention as set forth in claim 6 wherein said means included in said second channel is an amplitude detector.

10. The invention as set forth in claim 6 wherein said fifth output providing means includes separate logarithmic amplifiers in said first and second channels respectively responsive to said third and fourth outputs, and means for providing the difference between the amplitudes of said third and fourth outputs to provide said fifth output.

11. A system for tuning a matching network to which signals are applied having a tuning element which comprises:
   a. means for providing a first control signal having a characteristic, which is a function of the real part of the impedance to be matched by said network,
   b. means for providing a second control signal having a characteristic which is a function of the real part of the admittance to be matched by said network,
   c. control means for adjusting said tuning element, and
   d. means for alternatively applying said first and second control signals to said control means so that said network alternatively matches the real part of said impedance to be matched and said real part of said admittance to be matched.

12. The invention as set froth in claim 11 including means for connecting said matching network input to a radio transmitter, and means for connecting said matching network output to an antenna.

* * * * *